W. F. DREW.
DRIVE MECHANISM.
APPLICATION FILED MAY 13, 1918.
1,306,330.
Patented June 10, 1919.
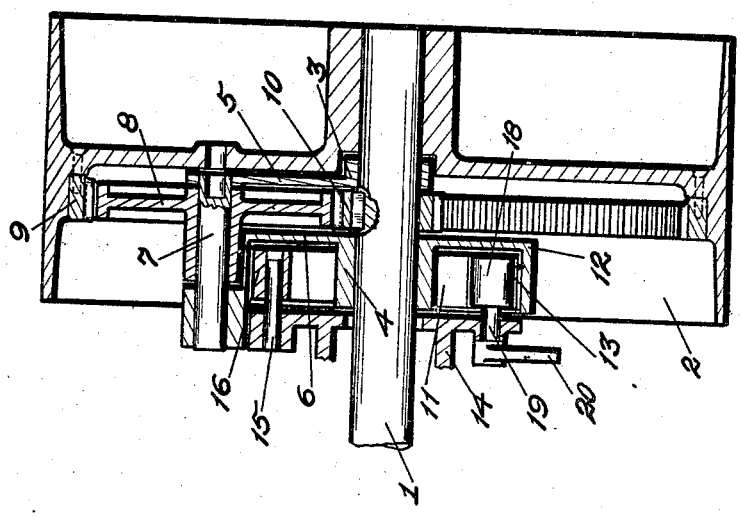
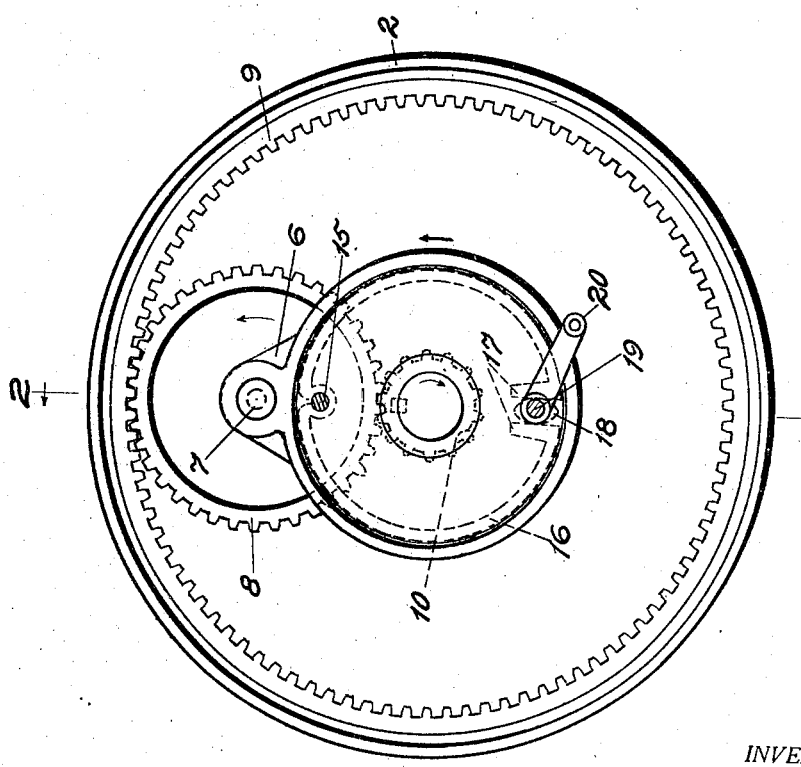
INVENTOR.
BY Wm F. Drew
Acker & Tollen
ATTORNEYS.

_UNITED STATES PATENT OFFICE._

WILLIAM F. DREW, OF OAKLAND, CALIFORNIA.

DRIVE MECHANISM.

1,306,330. Specification of Letters Patent. Patented June 10, 1919.

Application filed May 13, 1918. Serial No. 234,091.

*To all whom it may concern:*

Be it known that I, WILLIAM F. DREW, a citizen of the United States, residing at Oakland, in the county of Alameda and State of California, have invented certain new and useful Improvements in Drive Mechanism, of which the following is a specification.

The present invention relates to a variable speed power transmitting mechanism and has for its principal objects to provide a construction wherein a connection is at all times maintained between the drive and driven members and the movement of said connection controls or varies the power transmitted from the drive to the driven member to regulate the speed of the latter.

The present invention is particularly adapted for use in belt drives although the same is equally as desirable for transmitting power from a drive shaft to the drive and supporting wheel or wheels of a vehicle.

With the above mentioned and other objects in view, the invention consists in the novel construction and combination of parts hereinafter described illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein;

Figure 1 is a view in side elevation of the preferred embodiment of my invention.

Fig. 2 is a vertical sectional view taken on the line 2—2 of Fig. 1.

Referring more particularly to the several views of the drawings wherein like characters of reference designate corresponding parts, 1, indicates a suitable drive shaft adapted to be rotated in the direction of the arrow, Fig. 1 by power applied from any suitable source. The shaft carries a driven member 2 for purposes of illustration, the same being disclosed in the form of a band wheel, adapted to receive a belt, or other flexible means passing around the periphery thereof, however, said driven member may be in the form of a vehicle supporting and driving wheel. Supported by the driven member 1 for free rotation about the same are the spaced hub portions 3 and 4 from which extend laterally the respective supporting arms 5 and 6. Connecting the outer ends of said arms is a shaft 7, rotatably mounting an idler gear 8 which intermeshes with an internal gear 9 secured to the inner periphery of the driven member 2 and with a drive pinion 10 keyed to the driving member 1 between said hubs 3 and 4. The supporting arm 6 is provided with an annular recess or depression 11, surrounding the drive member 1 and the same forms an annular flange portion 12, providing a brake drum surface 13. Secured to any stationary support, not shown, is a head or sustaining member 14, through which the driven member 1 passes and said member 14 lies adjacent and preferably provides a closure for the depression 11. Positioned within the depression 11 and secured at one side to the pin 15 is a brake 16 of any suitable type, the meeting edges of which are preferably flanged as at 17 and between the same is mounted a cam or other operating member 18 carried by a shaft 19 passing through the member 13, said shaft being connected to and operated by the movement of a lever 20.

Power being applied to operate the driven member 1 in the direction of the arrow Fig. 1 will cause rotation of the pinion 10 which will in turn rotate the idler gear 8, and cause a free movement of the idler gear 8 and arms 5 and 6, within the drive member 2.

On the operation of the lever 20, to expand the brake 16, against the drum 13, the movement of the arms 5 and 6 and idler gear 8 about the drive member 1 will be retarded, and the retarding of such movement will transmit a proportionate amount of power to the driven member 2 and causing rotation of the same. At such time as the brake 16 locks or maintains the arms 5 and 6 stationary the power transmitted to the driven member 1 will be in turn through the idler gear 8 transmitted to the driven member 2 causing a rotation of the same in accordance with the gear ratio of the pinion 10, idler gear 8 and internal gear 19.

I have provided a simple and compact construction of but few parts which is capable of supplanting the complicated mechanisms now employed in the transmission of power particularly through belt drives, and one wherein the transmission of power from the drive to the driven member may be gradually increased until such time as the driven member is operated at its maximum speed.

Having thus described the invention what I claim is:—

1. In combination with a drive shaft, a driven wheel provided with a supporting web terminating in oppositely disposed lateral flanges providing a traction surface, said wheel being further provided with a hub extended from one face of said web, said wheel being mounted for axial rotation about the shaft, a frame supported by said shaft and capable of free axial rotation about the same, said frame being provided with a brake surface surrounding said shaft, a pinion on said shaft, an internal gear on said wheel adjacent the wheel supporting web and between the opposite sides of the wheel flange, an idler gear rotatably carried by said frame and intermeshing with said pinion and internal gear, and a brake capable of operation to engage said brake surface to arrest the movement of said idler gear circumferentially of the driving member to maintain the same stationary, whereby said connection will transmit power from said drive member to said driven wheel at a point adjacent its supporting web and between the opposite sides of said wheel flange.

2. A device for the described purpose comprising a rotatable shaft, a laterally flanged driven wheel rotatably mounted thereon, an internal ring gear carried on the inner face of said wheel flange between the opposite side edges thereof, a pinion fixed to said shaft, a supporting arm rotatable about the shaft and formed with an overhanging annular flange, the inner face thereof providing a brake surface, a gear connecting said pinion and ring gear and rotatably supported by said arm, a sustaining member adjacent said wheel and shaft, a brake band carried by said sustaining member and lying within the flange of said supporting arm, and means associated with said sustaining member for operating said brake band.

In testimony whereof I have signed my name to this specification in the presence of two subscribing witnesses.

WILLIAM F. DREW.

Witnesses:
HARRY A. TOTTEN,
D. B. RICHARDS.

Copies of this patent may be obtained for five cents each, by addressing the "Commissioner of Patents, Washington, D. C."